United States Patent [19]
Zar

[11] 3,753,150
[45] Aug. 14, 1973

[54] LASER MIRROR POSITIONING APPARATUS

[75] Inventor: Jacob L. Zar, North Andover, Mass.

[73] Assignee: Anco Corporation, Everett, Mass.

[22] Filed: Sept. 6, 1972

[21] Appl. No.: 286,724

[52] U.S. Cl. .............................. 331/94.5, 350/285
[51] Int. Cl. ............................................ H01s 3/08
[58] Field of Search .................. 331/94.5; 350/285, 350/289

[56] References Cited
UNITED STATES PATENTS
3,316,800   5/1967   Kibler ........................ 331/94.5

Primary Examiner—William L. Sikes
Attorney—Charles M. Hogan, Gary M. Gron et al.

[57] ABSTRACT

The coupling, return and transfer mirrors within a high-powered laser housing each are mounted to a frame at three stations 120° apart. Step motors at two of the stations are energized from the housing exterior to displace the mirrors and thus vary their orientation. The transfer mirror is oriented to point an output laser beam through an opening in the housing by a control system responsive to the distribution of heat around the opening to control the step motors for the transfer mirror.

18 Claims, 5 Drawing Figures

LASER MIRROR POSITIONING APPARATUS

The present invention relates to high power lasers and more specifically to apparatus for positioning the laser beam-reflecting mirrors within said laser.

In recent years lasers have been developed that have such high power that the output laser beam developed within a subatmospheric cavity cannot be passed through a window of transparent material to the exterior. The energy level of the laser beam is so high that it would quickly disintegrate the window. In order to eliminate this obstacle an aerodynamic window has been utilized which permits the laser beam to pass through an opening exposed to the atmosphere but which enables the laser cavity in which the beam is generated to be maintained at a subatmospheric level. This advance in the art is discussed in detail in patent application Ser. No. 249,607, entitled "Aerodynamic Laser Window", in the name of Ethan D. Hoag et al, filed on May 2, 1972 and of common assignment with the present invention. Briefly, this type of laser comprises mirrors forming a regenerative laser cavity in which a high-powered laser beam is generated. An output laser beam is reflected through an aerodynamic window to the exterior of the laser housing. The window has a series of discs with aligned openings through which the laser beam passes. The spaces between the discs are pumped down to a pressure level below that in the laser cavity, thereby preventing inflow of air.

The positioning of the mirrors in this type of laser is extremely important. This necessitates alignment of the mirrors, which in the past has been accomplished manually by disassembling the laser housing and aligning the mirrors. The disassembly of the housing is time consuming and complicated.

Another approach is to mechanically position the mirrors by connections extending through the exterior of the housing to eliminate the need for disassembly. However, mechanical connections passing through the laser housing makes it difficult to maintain a vacuum seal at that point.

Furthermore, there are certain problems with respect to the pointing of the output laser beam through the opening to the exterior of the housing. Ideally, one of the mirrors in the housing is oriented to direct the output laser beam through the center of the hole. However, during operation, the laser beam can become slightly deflected. Deflection may occur because of temperature changes which cause a change in the index of refraction of the laser gas. Also, it may occur because of deflections of the mirror mounts resulting from heating during operation of the lasers. Positioning of the beam to one side of the center of the opening would unduly heat up one portion of the material defining the opening, thereby distorting it and possibly damaging it.

Therefore it is an object of the present invention to accurately position reflective mirrors within a laser cavity from the exterior of the laser without the need for mechanical connections through the laser housing.

It is also an object of the present invention to accurately point the output laser beam through an opening to the exterior of the laser housing.

In one aspect of the present invention these ends are achieved in a laser by a reflective mirror support having at least three points that define the orientation plane of the mirror it supports. A connecting means between the mirror support and a fixed support means is actuatable to displace the mirror support in a direction generally lateral to the plane at at least two positions, thereby varying the orientation of the plane. Electrically driven motors at the two positions actuate the connecting means and an electrical connection extends from the motors to a source of electrical power at the exterior of the housing.

In another aspect of the present invention a reflective mirror, which points an output laser beam through an opening to a point exterior of the housing, has a mirror support for mounting the mirror. The mirror support has at least three points that define a plane fixing the orientation of the mirror. A connection means between the points on the mirror support and a fixed support in the housing is actuatable to displace the mirror support in a direction generally lateral to the plane at at least two of the positions, thereby varying the orientation of the plane. A means at the two positions actuates the connecting means and a means responsive to the distribution of heat around the opening controls the actuating means to orient the support plate to produce an even distribution of heat around the opening. Therefore, the output laser beam is accurately pointed through the opening.

The above and other related objects and features of the present invention will be apparent from a reading of the description of the disclosure shown in the accompanying drawings and the novelty thereof pointed out in the appended claims.

Figure 1:
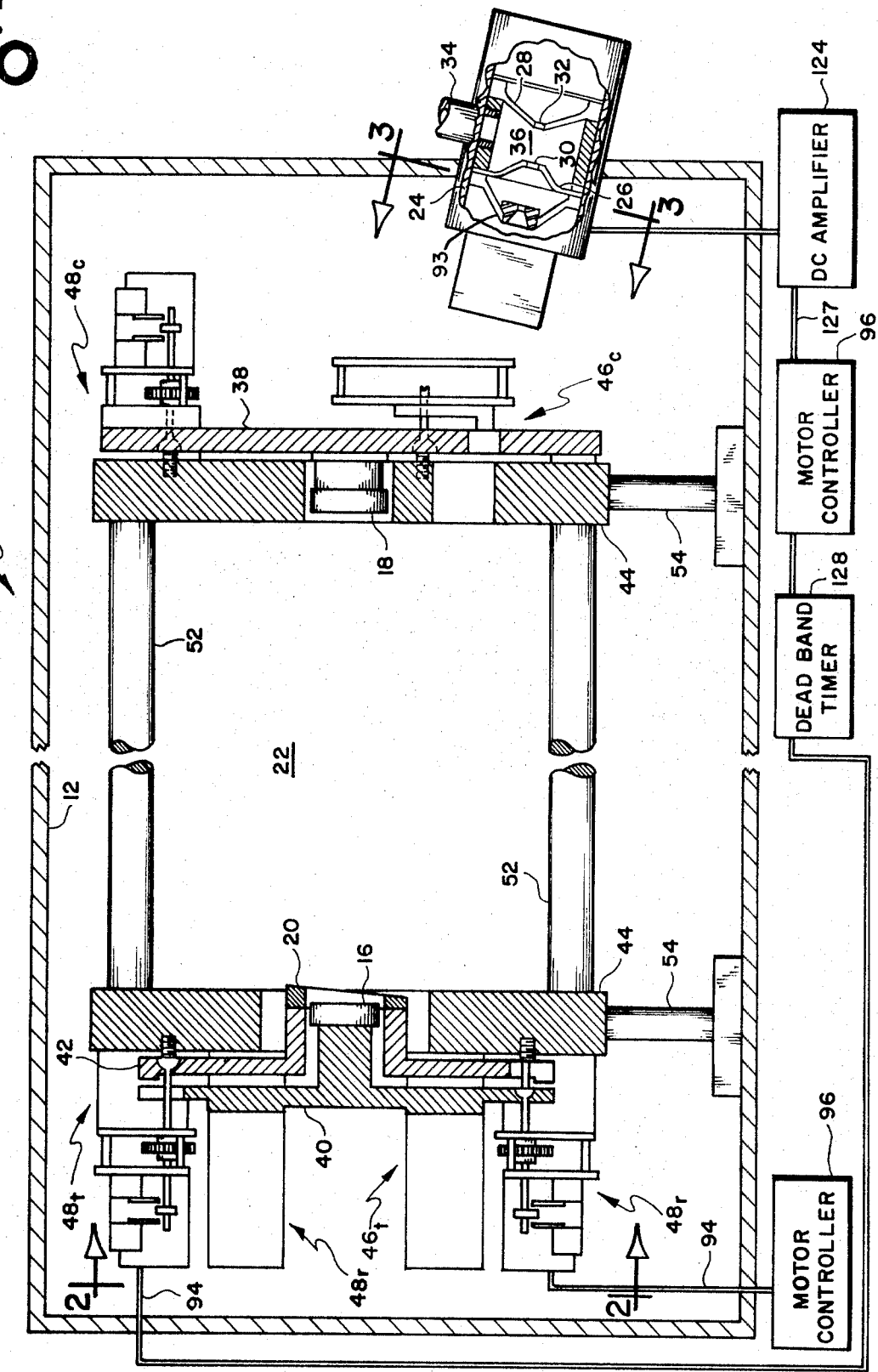
FIG. 1 is an elevational view of a high-powered laser which embodies the present invention.

Referring to FIG. 1 there is shown a high-powered laser, generally indicated by reference character 10, comprising an outer housing 12 maintained at a subatmospheric level by a suitable vacuum pump (not shown and to simplify the discussion of the present invention). The housing 12 defines a regenerative laser cavity 22 in which a return mirror 18, coupling or feedback mirror 16 and transfer mirror 20 are positioned.

The above-mentioned application to Hoag et al discussed fully the manner in which a laser beam is amplified in the laser cavity 22 to produce a high output laser beam, so it need not be repeated in detail. For the present discussion it is sufficient to say that a laser gas, such as Argon, Xenon, Krypton, or mixtures of $CO_2$, $N_2$, HE, is pumped through the laser cavity at a desired pressure and appropriate velocity. The laser gas may be excited to a lasing state by a suitable means, such as an electrical discharge maintained through the gas in cavity 22 or by a broad area electron beam entering the laser cavity. Transfer mirror 20 is positioned to reflect a portion of the high-power laser beam generated within cavity 22 and focus it through an aerodynamic window, generally indicated by reference character 24, to another optical system exterior to housing 12 and designed to direct and refocus the laser beam.

The aerodynamic window 24, which is discussed in detail in the above application, has central openings 30, 32 through a series of discs 26 and 28, only two of which are shown. The openings 30 and 32 in discs 26 and 28, respectively, are in alignment with the optical axis of transfer mirror 20.

To enable the laser chamber to be maintained at a subatmospheric level, a suitable pump is connected to passage 34 leading from the annular space 36 between the discs 26 and 28. It is pointed out that in practice other discs are utilized to establish appropriate flow conditions through the aerodynamic window.

As described above, the positioning of the mirrors within the laser housing 12 is critically important. In accordance with the present invention the mirror-positioning apparatus described below enables the mirrors to be readily positioned from a point exterior of the housing and also insures that the output laser beam is centrally positioned through the holes 30 and 32 in the aerodynamic window 24. The positioning apparatus will be described in connection with the oscillator-type laser shown in the drawings. It should be pointed out, however, that the positioning apparatus may be employed with other types of lasers with equal success.

Figure 2:
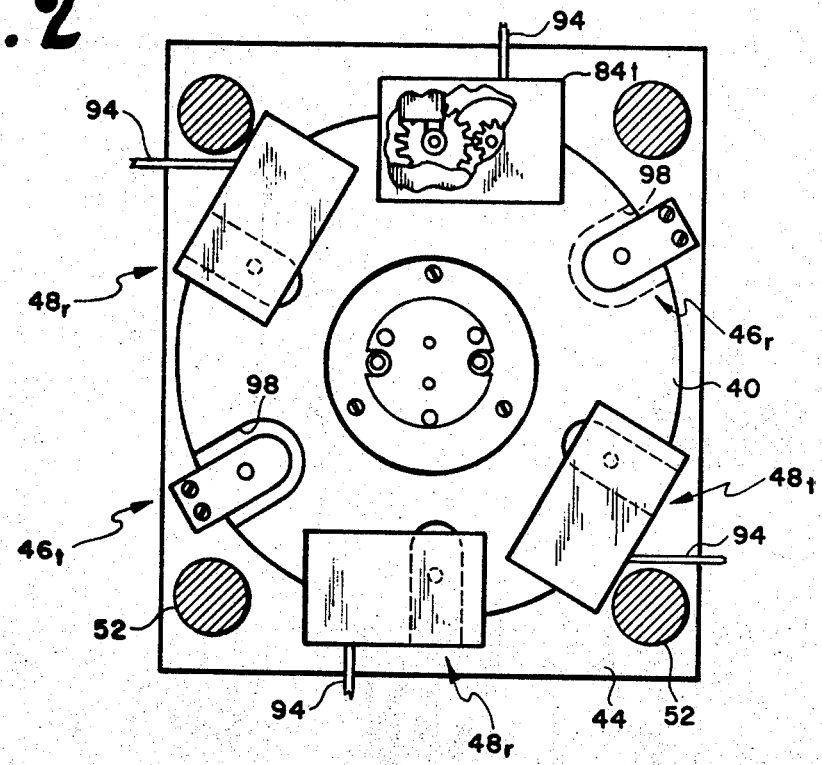
FIG. 2 is a cross-sectional view of the laser of FIG. 1, taken on line 2—2 of FIG. 1, showing mechanism for orienting the reflective laser mirrors.

Coupling mirror 18 is mounted on a disclike mirror support 38; return mirror 16 is mounted on a disclike mirror support 40; and transfer mirror 20 is mounted on a similar disclike mirror support 42. Each mirror support 38, 40 and 42 is connected to one of a pair of fixed supports 44 by an adjustable connection 46 and a pair of actuatable connections 48, as shown in FIGS. 1 and 2. In order to differentiate between the connections for the coupling, return and transfer mirrors, the reference character 46 or 48 will have a subscript $c$, $r$ and $t$, respectively. Fixed supports 44 are rigidly supported relative to one another by a series of rods 52 and maintained above the floor of the housing 12 by pedestals 54.

Figure 4:
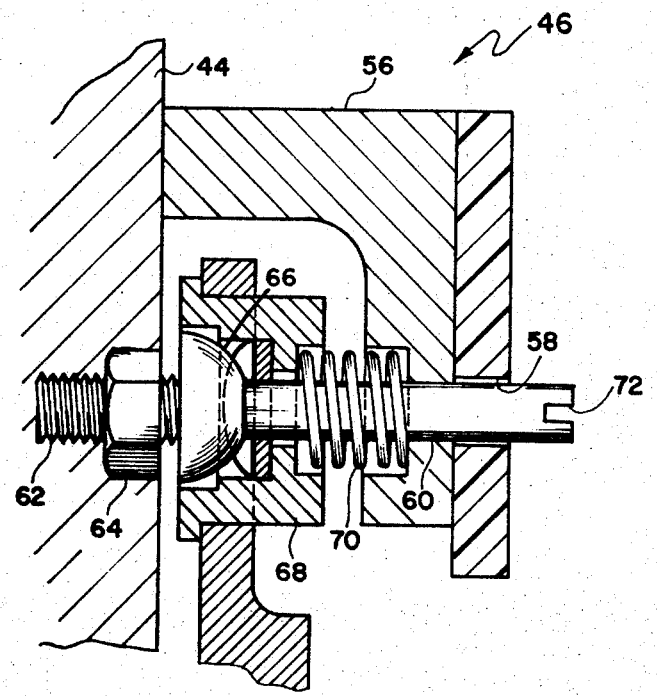
FIG. 4 is a fragmentary enlarged connection for adjustable mirror support connections incorporated in the laser of FIG. 1.

FIG. 4 shows in greater detail the adjustable connections 46. Each connection 46 comprises a support frame 56 secured to the fixed support 44 and having an opening 58 through which a shaft 60 extends. Shaft 60 has a threaded portion 62 engaging a nut 64 fixed in the fixed support 44. Shaft 60 also has an integral spherical shoulder 66 which engages a V-block type seat 68 secured to the appropriate mirror support. A spring 70 acts on seat element 68 and support 56 to yieldingly urge the seat element 68 against the spherical seat 66. Shaft 60 has a slotted end 72 so that shaft 60 may be twisted by a suitable adjusting tool. This rotation moves the shaft 60 in and out of the nut 64, thereby varying the displacement of the seat element 68 and thus the mirror support relative to the fixed support 44.

Figure 5:
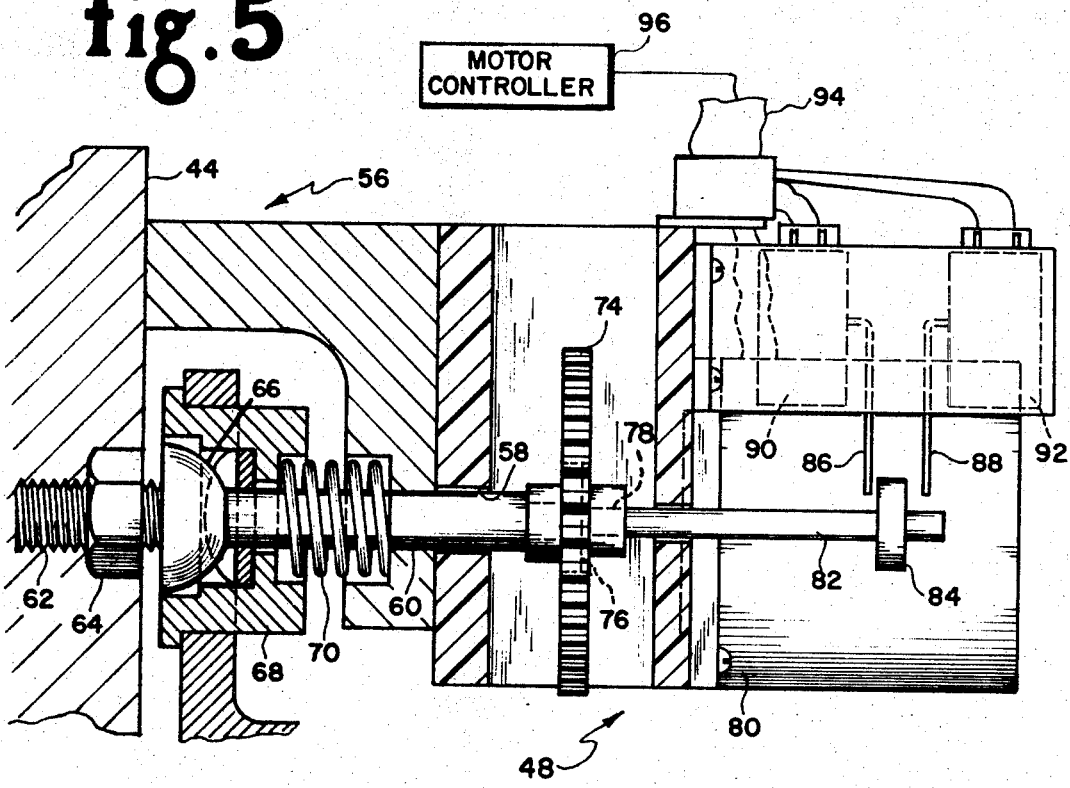
FIG. 5 is a fragmentary enlarged connection for actuatable mirror support connections incorporated in the laser of FIG. 1.

FIG. 5 shows the actuatable connections 48 in greater detail. These connections are identical to the adjustable connections 46 because they incorporate the same support frame 56, shaft 60 and seat element arrangement. The actuatable connections 48 have, in addition, a driven gear 74 secured to shaft 60. Driven gear 74 engages a smaller driving gear 76 secured to the output shaft 78 of an electric motor 80. Electric motor 80 is an electrically driven motor, preferably a step motor, that is adapted to receive either D.C. pulses or A.C. current. A step motor suitable for this purpose is manufactured by the Superior Electric Company, 97 Lee Avenue, Bristol, Conn. 06010, under the designation Step Motor No. SS-24. In order to insulate the motor 80 and its typically electrically conductive output gear 76 from the high voltage environment existing in chamber 62, motor 80 is connected to support 56 through an electrically nonconductive connection and driven gear 74 is formed from a nonconductive material.

A shaft 82 formed from insulating material extends from the end of shaft 60 and has a flange 84 on it. Flange 84 is positioned between contact arms 86 and 88 of limit switches 90 and 92, respectively. Movement of flange 84 beyond the predetermined limits set by the position of contact arms 86 or 88 places switch 90 or 92 in an off condition. Limit switches 90 and 92 are series connected between the motor 80 and an electrical cable 94 which extends from the motor 80 through housing 12 to an exterior control unit 96 adapted to supply D.C. pulses or A.C. current. Application of electrical power from control unit 96 through cable 94 to motor 80 rotates shaft 60 and thus displaces seat element 68 and the mirror support to which it is connected toward and away from the fixed support 44.

The connections 46 and 48 for the individual mirror supports are spaced from one another so that they form a three-point mounting for each mirror support. For example, the adjustable connection $46_r$ and the actuatable connections $48_r$ for the return mirror are spaced from one another to form a three-point support for the return mirror 16. As herein shown in FIG. 2, these connections are spaced 120° from each other around the circumference of the disclike support plate 40. The supports $46_t$ and $48_t$ are arranged in a similar fashion. Since mirror supports 40 and 42 are stacked, notches 98 in their periphery enable clearance for a direct connection from the mirror support to fixed support 44.

The three-point mounting for each of the support plates establishes and defines the orientation of the plane for the respective mirrors. With the adjustable connections $46_r$, $46_c$ and $46_t$ established in essentially a fixed position, energization of the motors 80 at the actuatable connections 48 will vary the orientation of the planes by displacing the mirror supports generally lateral to these planes.

The motors 80 may be supplied with A.C. current to rapidly rotate the shafts 60 for a coarse initial orientation and then supplied with D.C. pulses to achieve a relatively slow and precise final orientation of the mirrors. Overtravel of the shaft 46 is prevented by the limit switches 90 and 92.

Thus it is seen that the variation in the orientation of the coupling, return and transfer mirrors can take place from a point exterior of housing 12 without the need for disassembly of the housing or the provision of a complex mechanically sliding connection through housing 12. Hermetic seals for electrical cables are well known and effective devices that are very simply installed. It is pointed out that the adjustable connections 46 are, in effect, fixed connections since they are set in a mid position initially and left in that condition for operation of the laser 10. It should be apparent that a fixed connection at that point could also be used. The plane establishing the orientation of the mirror has been established by three points which is the minimum necessary to establish a plane. It should be apparent, however, that additional points may be utilized with an appropriate selection of fixed and actuatable connections.

As described above, the transfer mirror 20 is angled with respect to the mirrors 16 and 18 to reflect the output laser beam through the openings 30 and 32. In accordance with the present invention, this mirror is positioned so as to point the beam through the center of opening 30.

Figure 3:
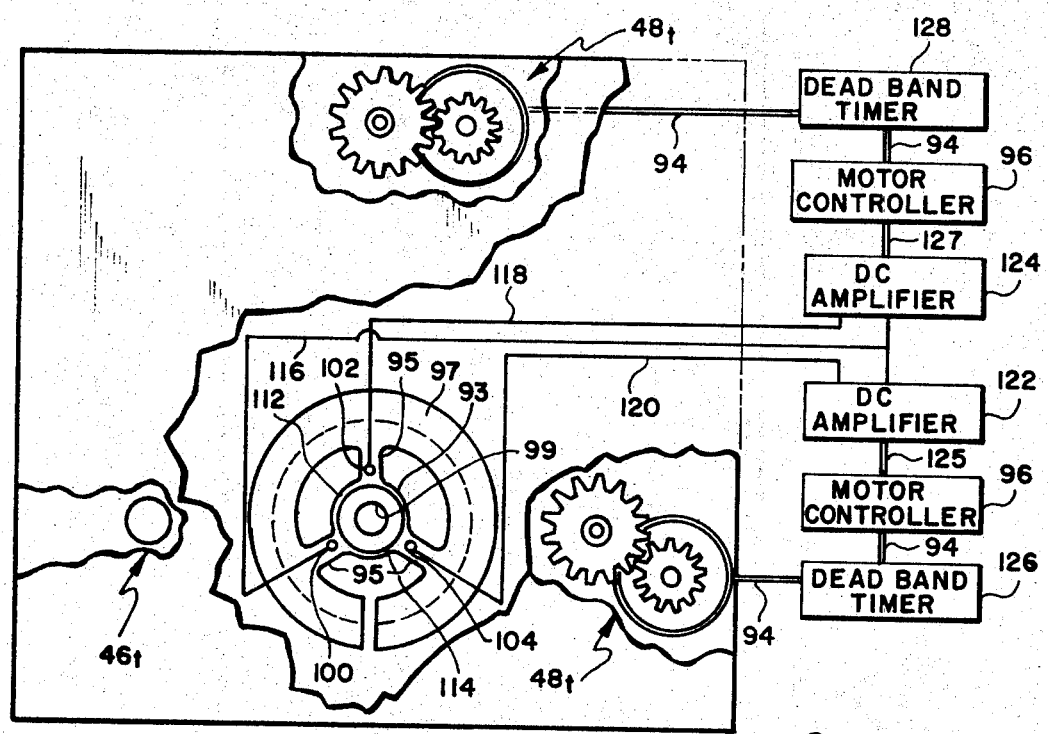
FIG. 3 is an enlarged fragmentary cross-sectional view of the laser shown in FIG. 1, taken on line 3—3 of FIG. 1.

As shown in FIGS. 1 and 3, a hub 93 is supported in front of disc 26 by spokes 95 extending to a rim 97 suitably fixed relative to discs 26 and 28. Hub 93 has a central opening 99 in line with the optical axis extending from transfer mirror 20 through openings 30 and 32. A series of thermocouple junctions 100, 102 and 104 are imbedded in spokes 95. The thermocouple junctions 100, 102 and 104 are in alignment with adjustable connection $46_t$ and top and side actuatable connections $48_t$, respectively, when viewed along the optical axis of the opening 99 and mirror 20, as shown in FIG. 3. Constantan wires 112 and 114 interconnect junctions 100–102 and junctions 100–104. Copper wires 116, 118 and 120 extend, respectively, from junctions 100, 102 and 104. Wire 120, through a suitable connection, extends to a suitable D.C. amplifier 122 with the wire 116 extending as a common lead. Wire 118 extends to a suitable D.C. amplifier 124 with the wire 116 as a common ground.

The voltage outputs from the amplifiers 124 and 122 are fed via cables 125, 127 to the motor controllers 96 for the top and side actuatable connections $48_t$, respectively, for transfer mirror support plate 42. The motor controllers 96 are adapted to send out bidirectional D.C. pulses to the motors in response to the generation of a predetermined D.C. voltage from the amplifiers 122 and 124. Deadband timers 126 and 128 are respectively interposed in the cables 94 for the top and side actuatable connections $48_t$. As will be described later, these timers provide for a delay of approximately 4 seconds between D.C. current pulses passing to the motors 80.

During operation of the laser 10, the output laser beam may pass centrally through opening 99. When this occurs the thermocouple junctions 100, 102 and 104 each receive an equal amount of heat so that they are at essentially the same temperature. Since there is no temperature difference between junction 102–100 and 104–100, there is a 0 voltage output and the motor controllers 96 do not pass D.C. current pulses to the motors 80. If, however, the beam becomes misaligned one of the junctions will be hotter than the others and this will be reflected in a voltage output to either amplifier 124 or 122. It should be recognized that since the thermocouples are arranged in a differential relationship, i.e., junctions 102 and 104 are both referred to junction 100, that the output to the D.C. amplifier 122 and 124 can be either positive or negative, thus indicating whether the junctions 102 or 104 are hotter or colder than junction 100. The D.C. voltage is fed to the motor controllers 96 and when it exceeds a predetermined minimum level causes the motor controllers 96 to pass a D.C. current pulse of the appropriate polarity to the motor 80 for either the top or side actuatable connection $48_t$. The motor 80 turns the shaft 60 to displace the mirror support toward or away from the fixed support 44, depending on the polarity of the pulse. As pointed out previously, the deadband timers 126 and 128 interject a deadband between current pulses passing to the motors 80. This is done to compensate for the lag between the time heat first strikes the edge of opening 99 and the time it passes to the thermocouple junctions. If during the deadband period the laser beam is moved to the center of opening 99, the temperature of the thermocouple junctions will be identical and the controller 96 will not pass any further pulses. If the unbalance still exists the controller will pass additional pulses with the time delay in between until a uniform heat distribution exists around opening 99.

The net effect of this is to minimize, if not eliminate, the tendency for the control system to hunt about the desired position of the laser output beam. Since the thermocouple junctions have a one to one correspondence with the location of the mirror support connections, they position the mirror in direct proportion to the variations in heat at that point. This enables an extremely precise and automatic positioning of the output laser beam through the center of opening 99, irrespective of changing conditions within the laser housing 12.

The control system for positioning the transfer mirror to automatically point the output laser beam has been described in connection with thermocouple junctions sensing heat distribution. It should be apparent that other forms of heat distribution sensing and actuating devices, such as hydraulic and pneumatic devices, can be used to orient the transfer mirror with equal success.

While the preferred embodiment of the present invention has been described, it should be apparent that other modifications may be performed without departing from the spirit and scope thereof.

Having thus described the invention, what is claimed as novel and desired to be secured by Letters Patent of the United States is:

1. In a gaseous laser system contained in a housing having at least a pair of opposed reflective mirrors forming a regenerative laser cavity, apparatus for positioning said mirrors, said apparatus comprising:
   fixed support means in said housing;
   a mirror support for mounting each of said mirrors, said mirror support having at least three points that define a plane fixing the orientation of each mirror;
   means connected between said fixed support means and said points on the mirror support, said connecting means actuatable to displace said mirror support generally lateral to said plane at at least two of said positions thereby varying the orientation of said plane;
   electrically driven motors at said two positions for actuating said actuatable connecting means; and
   electrical conduit means for connecting a source of electrical power from the exterior of said housing to said motors;
   whereby said mirrors are positioned from the exterior of said housing without the need for a movable mechanical connection through said housing.

2. Apparatus as in claim 1 wherein;
   said mirror support has three points defining said plane, one of which is fixed and the other two of which are actuatable;
   said apparatus has electrical motors at two of said points.

3. Apparatus as in claim 1 wherein a high voltage environment exists within said housing and wherein said electrically driven motors are mounted on said fixed support and are electrically insulated from said environment by interposing an electrically nonconductive component in the mechanical output of said motor, said motor being mounted to said fixed support through an electrically nonconductive connection.

4. Apparatus as in claim 3 wherein said motors provide a rotary output for actuating said connecting means and wherein said motor has an electrically conductive output spur gear driving a gear of electrically nonconductive material.

5. Apparatus as in claim 4 wherein said actuatable connections comprise:
a threaded shaft secured to said drive gear and having its axis positioned generally lateral to said plane, said shaft threadingly engaging said fixed support means whereby rotation of said shaft displaces the shaft relative to said fixed support means;
a spherical shoulder secured to said shaft;
a seat abutting said spherical shoulder, said seat being connected to said mirror support; and
a spring yieldingly urging said seat against said spherical shoulder whereby rotation of said gear displaces said shaft and said mirror support relative to said fixed support means.

6. Apparatus as in claim 5 further comprising:
a flange secured to said threaded shaft and movable therewith;
a pair of limit switches secured to said fixed support means and having contact arms positioned on opposite sides of said flange at predetermined positions, said limit switches being interposed in said electrical connection means whereby displacement of said shaft relative to said fixed housing beyond said predetermined positions electrically disconnects said motors.

7. Apparatus as defined in claim 1 wherein said electrical motors are step motors adapted to receive D.C. pulses.

8. Apparatus as in claim 7 wherein said step motors are adapted to selectively receive D.C. pulses and an A.C. input, thereby enabling the motors to position the mirror support at a slow or fast rate, respectively.

9. Apparatus as in claim 1 having three mirrors, two of which are opposed and generally parallel to form said regenerative laser cavity and the third of which surrounds one of said opposed mirrors and is angled with respect to the plane in which said mirrors are oriented to direct a portion of the laser beam generated within said cavity through an opening in said housing.

10. Apparatus as in claim 9 wherein the mirror supports for each of said mirrors have three points, one of which is fixed and the other two actuatable by said motors.

11. Apparatus as in claim 9 wherein:
said actuatable connecting means comprise a threaded shaft oriented generally lateral to the plane of said mirror and threadingly engaging said fixed support means, said shaft having a spherical shoulder against which a seat abuts, said seat being connected to said mirror support, and a spring yieldingly urging said seat against said spherical shoulder;
said motors comprise step motors mounted on said fixed support through an electrically nonconductive connection and having an electrically conductive output gear driving an electrically nonconductive gear secured to said threaded shaft.

12. In a gaseous laser system contained in a housing and having a reflective transfer mirror pointing a laser beam generated within said housing through an opening to a point exterior of said housing, apparatus for pointing said laser beam through said opening, said apparatus comprising:
fixed support means in said housing;
a mirror support for mounting said transfer mirror, said mirror support having at least three points that define a plane fixing the orientation of said transfer mirror;
means connected between said fixed support and said points on the mirror support, said connecting means actuatable to displace said mirror support plate generally lateral to said plane at at least two of said positions, thereby varying the orientation of said plane;
means at said two positions for actuating said actuatable connecting means;
means responsive to the distribution of heat around said opening for controlling said actuating means to orient the support plate to produce an even distribution of heat around said opening.

13. Apparatus as in claim 12 wherein said heat distribution responsive means includes a plurality of thermocouple junctions distributed around said opening and means receiving the output of said thermocouple junctions for controlling said actuating means.

14. Apparatus as in claim 13 wherein each thermocouple junction is in line with the connecting means actuatable by the signal generated from said thermocouple when viewed along the optical axis of said transfer mirror passing through the center of said opening.

15. Apparatus as in claim 14 wherein said opening is defined by an opening in a hub having a series of spokes extending radially outward to a rim and wherein said thermocouple junctions are mounted on said spokes.

16. Apparatus as in claim 14 wherein said mirror support plate has three connecting means, one being fixed and the other two actuatable and wherein:
said actuating means includes electrically driven motors at said two actuatable connecting means;
said apparatus has three thermocouple junctions mounted away from said opening in line with said connecting points when viewed along the optical axis of said transfer mirror passing through the center of said opening, the thermocouple in line with said fixed connection being a reference junction and the thermocouples at the two actuatable connections being hot junctions;
said heat distribution responsive means comprises means passing current to said motors in response to the differential temperature sensed by said thermocouples.

17. Apparatus as in claim 16 wherein said current passing means responsive to said control signal intermittently energizes said motors with D.C. pulses with a sufficient time delay between pulses to said motor to compensate for the thermal lag between the opening and the thermocouple junctions.

18. Apparatus as in claim 12 wherein said support plate has three points defining said plane and electrically driven motors at said two positions for actuating the actuatable connecting means and wherein said actuatable connections comprise:
a shaft having its axis positioned generally lateral to said plane and threadingly engaging said housing whereby rotation of said shaft displaces the shaft relative to said housing;

a spherical shoulder secured to said shaft;
a seat abutting said spherical shoulder, said seat being connected to said support plate;
means yieldingly urging said seat against said shoulder;
a gear of electrically nonconductive material;
said motor has a spur gear engaging said electrically insulating gear, said motor being secured to said housing through a nonconductive connection.

* * * * *